(12) United States Patent
Nakashima (10) Patent No.: US 9,569,329 B2
(45) Date of Patent: Feb. 14, 2017

(54) CACHE CONTROL DEVICE, CONTROL METHOD THEREFOR, STORAGE APPARATUS, AND STORAGE MEDIUM

(71) Applicant: NEC Corporation, Minato-ku, Tokyo (JP)

(72) Inventor: Toshitaka Nakashima, Tokyo (JP)

(73) Assignee: NEC CORPORATION, Tokyo (JP)

(*) Notice: Subject to any disclaimer, the term of this patent is extended or adjusted under 35 U.S.C. 154(b) by 30 days.

(21) Appl. No.: 14/660,186

(22) Filed: Mar. 17, 2015

(65) Prior Publication Data

US 2015/0269020 A1 Sep. 24, 2015

(30) Foreign Application Priority Data

Mar. 19, 2014 (JP) .................................. 2014-056689

(51) Int. Cl.
*G06F 11/30* (2006.01)
*G06F 11/10* (2006.01)
*G06F 11/07* (2006.01)

(52) U.S. Cl.
CPC ......... *G06F 11/3037* (2013.01); *G06F 11/076* (2013.01); *G06F 11/0727* (2013.01); *G06F 11/1064* (2013.01); *G06F 11/1076* (2013.01); *G06F 2211/1009* (2013.01)

(58) Field of Classification Search
CPC .............. G06F 11/3037; G06F 11/1064; G06F 11/0727
See application file for complete search history.

(56) References Cited

U.S. PATENT DOCUMENTS

2011/0047437 A1* 2/2011 Flynn ........................ G06F 9/52
714/758
2012/0054421 A1* 3/2012 Hiratsuka ........... G06F 12/0246
711/103

FOREIGN PATENT DOCUMENTS

| JP | H06-067816 A | 3/1994 |
| JP | 2004-326523 A | 11/2004 |
| JP | 2007-066129 A | 3/2007 |
| JP | 2012-048361 A | 3/2012 |
| JP | 2012-128646 A | 7/2012 |

OTHER PUBLICATIONS

Japanese Office Action for JP Application No. 2014-056689 mailed on Mar. 1, 2016 with English Translation.

* cited by examiner

*Primary Examiner* — Yolanda L Wilson (57) ABSTRACT

Disclosed is a cache control device which makes it possible to, even when a failure is occurred in a cache, reduce a risk that information is lost due to the failure.

A cache control device 1 includes a monitor unit 2 that monitors an occurrence of a failure of a plurality of storage devices which constitute a cache; and a control unit 3 that determines superiority or inferiority of the storage devices on the basis of life-span information and failure information which are related to the storage devices, and that changes a configuration of the cache in accordance with a result of the determination.

9 Claims, 10 Drawing Sheets

CACHE CONTROL DEVICE, CONTROL METHOD THEREFOR, STORAGE APPARATUS, AND STORAGE MEDIUM

This application is based upon and claims the benefit of priority from Japanese Patent Application No. 2014-056689, filed on Mar. 19, 2014, the disclosure of which is incorporated herein in its entirety by reference.

TECHNICAL FIELD

The present invention relates to, for example, storage devices each having a cache function.

BACKGROUND ART

In storage apparatuses each capable of storing therein an aggregate of data (information), for example, various measures are taken against a loss of information due to a failure. As one of the measures, for example, redundant arrays of inexpensive disks (RAID) method, in which the same block of data is stored in each of two storage devices, has been well known.

As related technologies existing prior to the application of the present invention, there are, for example, technologies disclosed in Patent Literature 1 to Patent Literature 3.

In Patent Literature 1, there is disclosed a technology related to a memory system as well as a control method for the memory system. The memory system disclosed in Patent Literature 1 is configured to, when performing a read or write processing, store a volatile piece of address information, which indicates a storage location of a block of data targeted for the read or write processing, into a cache memory. In this way, the memory system makes it possible to suppress that a capacity of the cache memory is increased, as compared with a case where storage locations of all stored blocks of data and logical addresses each associated with a corresponding one of the storage locations are stored in the cache memory. This Patent literature 1 is Japanese Unexamined Patent Application Publication No. 2012-128646.

In Patent Literature 2, there is disclosed a technology related to a storage device provided with rewritable non-volatile memory as well as a control method for non-volatile memory included in the storage device. The storage device disclosed in Patent Literature 2 is configured to, for each of a plurality of physical blocks provided inside non-volatile memory, in response to an operation of writing a set of data, store therein information indicating the number of the writing operations. Further, the storage device is configured to, in response to the operation of writing a set of data, refer to the stored writing operation number information. The storage device is configured to, when, as a result of the reference to the writing operation number information related to a physical block, the number of writing operations reaches a predetermined number, exchange the physical block targeted for the writing operation for another physical block. The storage device is configured to, when exchanging the physical block targeted for the writing operation for the another physical block, select a physical block which is different from anyone of already exchanged physical blocks and for which the number of writing operations is smaller than that of any other one of the physical blocks. In this way, the storage device makes it possible to equalize the number of writing operations among the plurality of the physical blocks. This Patent literature 2 is Japanese Unexamined Patent Application Publication No. 2004-326523.

In Patent Literature 3, there is disclosed a technology related to a memory failure reduction method in a semiconductor disk device. A semiconductor disk device disclosed in Patent Literature 3 is configured to count the number of accesses for each of a plurality of logical drives resulting from segmentation. The semiconductor disk device is configured to, upon occurrence of one bit error, count the number of occurrences of this error. The semiconductor disk device is configured to, when the number of accesses is larger than or equal to a predetermined number and, a ratio of occurrence of the error reaches a predetermined threshold value, start processing. That is, the semiconductor disk device is configured to exchange a set of information stored in the target logical drive for a set of data stored in another logical drive for which the number of accesses is smaller than that of any other one of the plurality of logical drives and, the number of occurrence of the error is smaller than that of any other one of the plurality of logical drives. In this way, the semiconductor disk device makes it possible to decrease the ratio of occurrences of a failure. In addition, the semiconductor disk is a solid state drive (SSD), and is referred to as an "SSD" in the following description of this patent application document. This Patent Literature 3 is Japanese Unexamined Patent Application Publication No. 1994-067816.

With respect to a storage apparatus, it is well known that the storage apparatus is provided with a group of caches for the purpose of carrying out a read processing and a write processing at higher speed. More specifically, for example, upon reception of a request for a read processing, the storage apparatus does not read a set of information from a hard disk drive, but reads it from a cache composed of SSDs. For such in the storage apparatus, there is a technology which utilizes an SSD capable of reading/writing a set of information at high speed, as a cache (also referred to as "a second cache"). In addition, in the following description of this patent application document, for the convenience of description, a hard disk drive will be referred to a "HDD".

Figure 7:
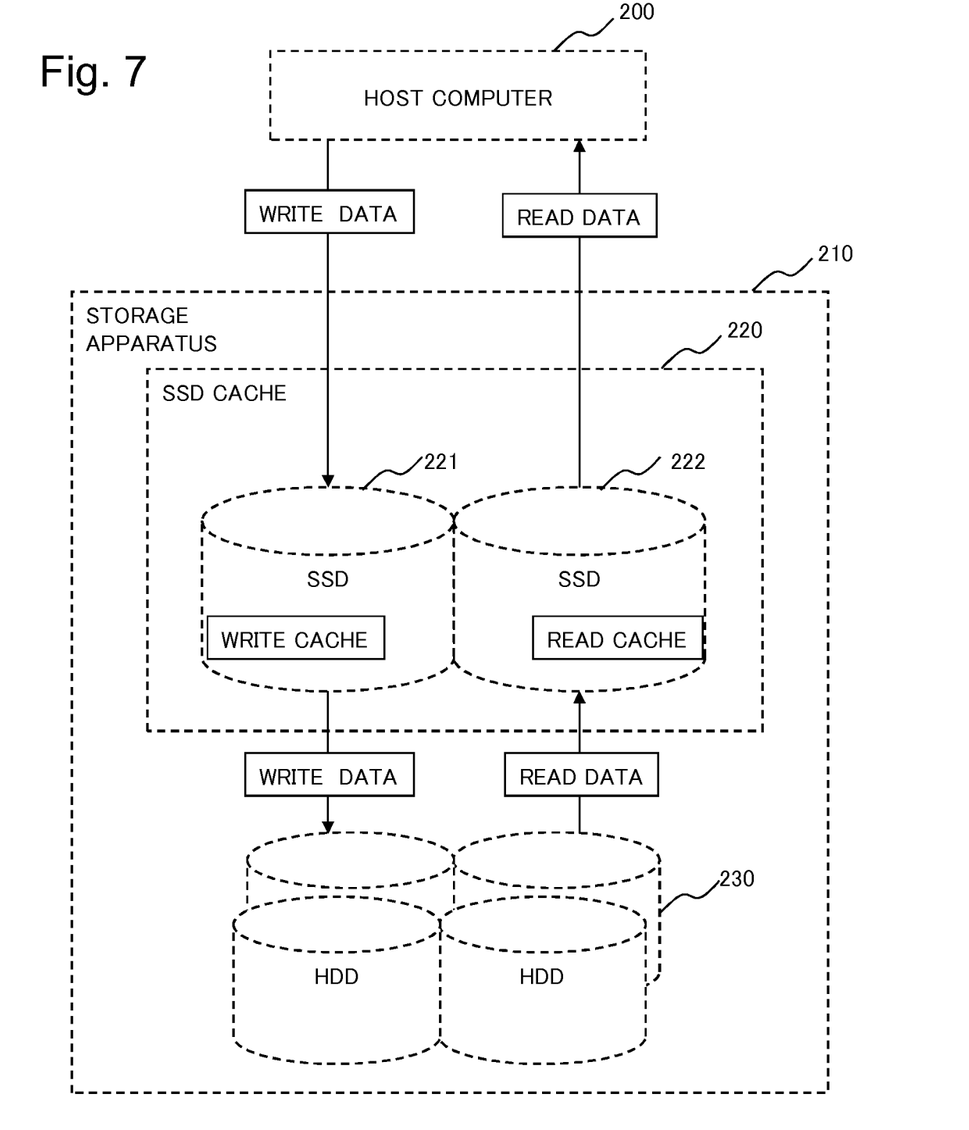
FIG. 7 is a block diagram illustrating a configuration of a generally known storage apparatus.

In the following description, more specifically, a generally known storage apparatus 210 will be described with reference to FIGS. 7 to 9. FIG. 7 is block diagram illustrating a configuration of the storage apparatus 210.

In FIG. 7, the storage apparatus 210 includes at least one HDD 230 each storing therein a set of information including data, as well as an SSD cash 220. The SSD cache 220 includes an SSD 221 and an SSD 222 each of which is superior in input/output (I/O) processing performance, as compared with the HDD 230.

In FIG. 7, when a write processing is carried out, a block of write data transmitted from a host computer 200 is cached into the SSD 221. The block of write data is stored in the HDD 230. When a read processing is carried out, a block of read data stored in the HDD 230 is cached into the SSD 222. The block of read data is transmitted to the host computer 200.

In the following description, for example, a case where a failure has occurred in the SSD 221 will be described with reference to FIG. 8.

Figure 8:
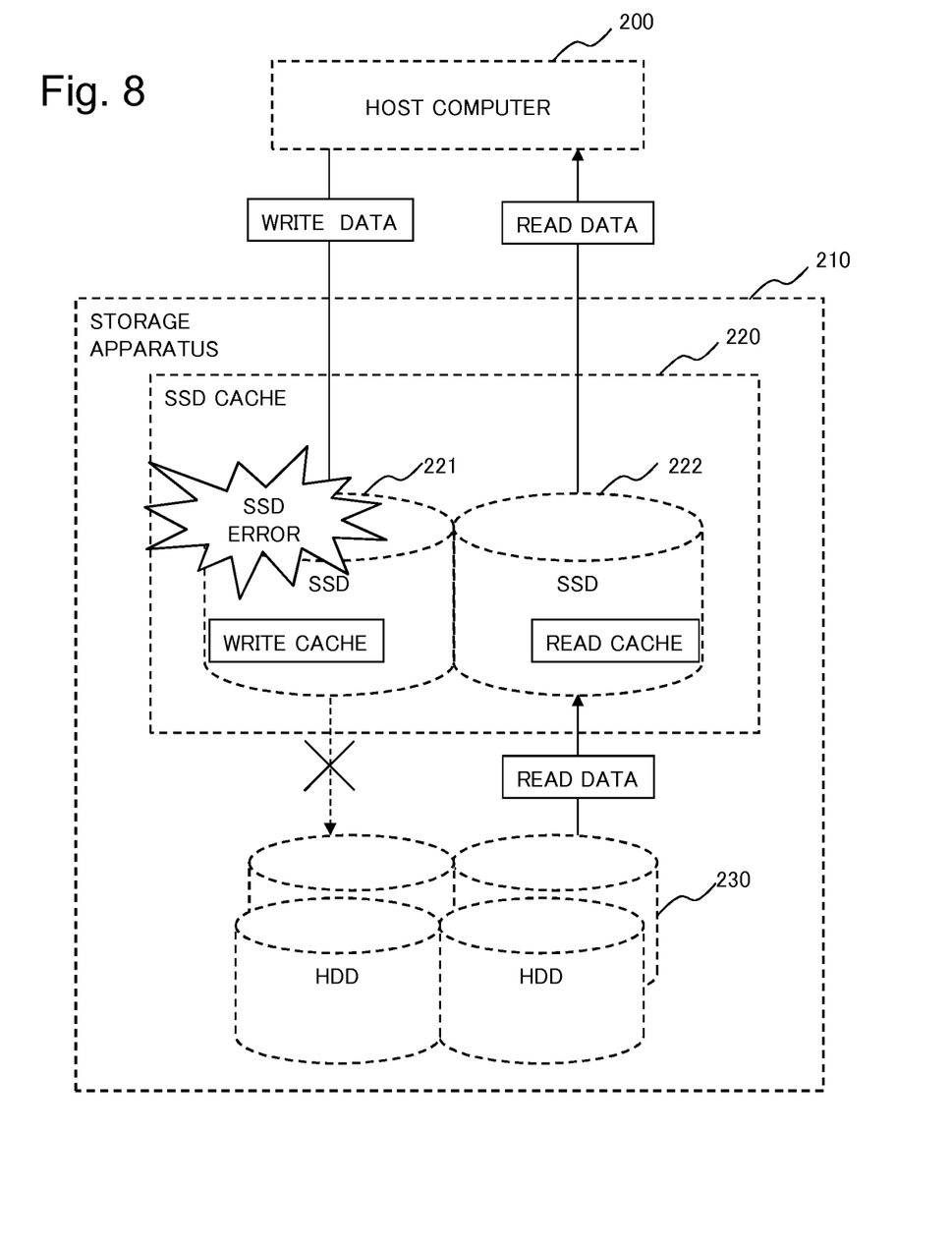
FIG. 8 is a diagram conceptually illustrating a state in which a failure has occurred in one of SSDs in a generally known storage apparatus.

FIG. 8 is a diagram conceptually illustrating a state in which, in the storage apparatus 210, a failure has occurred in the SSD 221. In addition, the configuration of the storage apparatus 210 shown in FIG. 8 is the same as that of the storage apparatus 210 shown in FIG. 7. Thus, detailed description of the configuration of the storage device 210 shown in FIG. 8 is omitted here.

In FIG. 8, when a failure has occurred in the SSD 221, the block of write data having been transmitted from the host computer 200 is not only stored in the HDD 230, but also the block of write data having been cached in the SSD 221 is also lost. That is, in such a generally known storage apparatus 210, the block of write data having been cached in the SSD 221 is lost and a data loss occurs.

Further, in the following description, for example, a case where a failure has occurred in the SSD 222 will be described with reference to FIG. 9.

Figure 9:
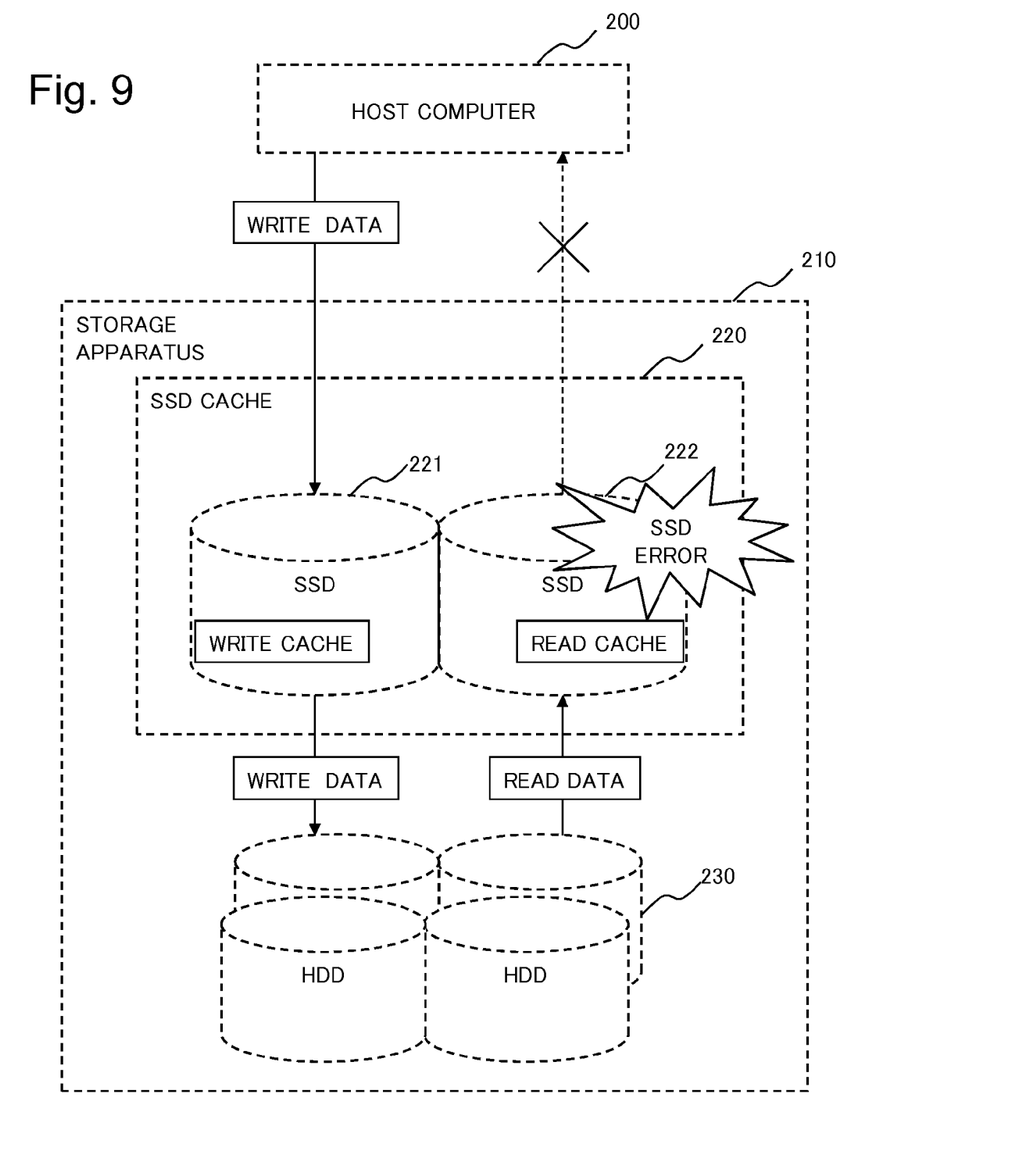
FIG. 9 is a diagram conceptually illustrating a state in which a failure has occurred in the other one of SSDs in a generally known storage apparatus.

FIG. 9 is a diagram conceptually illustrating a state in which, in the storage apparatus 210, a failure has occurred in the SSD 222. In addition, the configuration of the storage apparatus 210 shown in FIG. 9 is the same as that of the storage apparatus 210 shown in FIG. 7. Thus, detailed description of the configuration of the storage device 210 shown in FIG. 9 is omitted here.

In FIG. 9, when a failure has occurred in the SSD 222, the block of read data having been cached in the SSD 222 is stored in the HDD 230. Thus, even when a failure is occurred in the SSD 222, a data loss does not occur in the storage apparatus 210.

As described above, in such a generally known storage apparatus 210, when a failure has occurred in the SSD 221 which has cached the block of write data, the block of write data is likely not to be stored in the HDD 230. That is, in the storage apparatus 210, a data loss is likely to occur when the block of write data having been cached by the SSD 221 is not yet written into the HDD 230 from the SSD 221. Further, for example, even for a storage apparatus constituting a group of RAID, when multiple failures have occurred in SSDs, a data loss is likely to occur.

Further, a technology disclosed in each of patent literatures 1 to 3 is merely a disclosure of a technology for controlling the inside of an SSD. In anyone of patent literatures 1 to 3, any technology for allowing an SSD to operate as a cache is not disclosed and suggested. A technology disclosed in patent literature 1 is merely a technology for suppressing the increase of the capacity of the cache memory. Moreover, a technology disclosed in patent document 2 is merely a technology for equalizing the number of writing operations among physical blocks.

A technology disclosed in patent literature 3 is merely a technology for exchanging a logical drive by using the number of occurrences of an error and the number of accesses with respect to the logical drive. That is, in patent literature 3, any technology for building a write cache by preferentially using a high safety storage device is not taken into consideration, and is not described.

A main object of the present invention is to provide a cache control device and the like which makes it possible to, even when a failure is occurred in a cache, reduce a risk that information is lost due to the failure.

SUMMARY

In order to achieve the above object of the present invention, a cache control device according to an aspect of the present invention has a configuration described below.

That is, a cache control device includes:

a monitor unit configured to monitor an occurrence of a failure of a plurality of storage devices which operate as a write cache or a read cache constituting a cache; and a control unit configured to determine superiority or inferiority of the plurality of storage devices on the basis of life-span information related to a life-span of the plurality of storage devices and failure information which indicates a result of the monitoring by the monitor unit of the plurality of storage devices, and to change a configuration of the cache in accordance with a result of the determination.

Alternatively, the object of the present invention is also achieved by a storage apparatus including the cache control device described above.

Further, in order to achieve the object of the present invention, a cache control method according to another aspect of the present invention has a configuration described below.

That is, a cache control method includes:

monitoring, by an information processing apparatus, an occurrence of a failure a plurality of storage devices which operate as a write cache or a read cache constituting a cache; and determining, by the information processing apparatus, superiority or inferiority of the plurality of storage devices on the basis of life-span information related to a life-span of the plurality of storage devices and failure information which indicates a result of the monitoring of the plurality of storage devices, and changing, by the information processing apparatus, a configuration of the cache in accordance with a result of the determination.

Further, the object of the present invention is also achieved by a computer program which allows a computer to realize the cache control device having the configuration described above and the cache control method having the configuration described above, as well as a readable storage medium which stores the computer program therein.

According to aspects of the present invention, it is possible to provide a cache control device which makes it possible to, even when a failure is occurred in a cache, reduce a risk that information is lost due to the failure.

BRIEF DESCRIPTION OF THE DRAWINGS

Exemplary features and advantages of the present invention will become apparent from the following detailed description when taken with the accompanying drawings in which.

EXEMPLARY EMBODIMENT

Hereinafter, an exemplary embodiment of the present invention will be described in detail with reference to some of the drawings.

<First Exemplary Embodiment>

Figure 1:
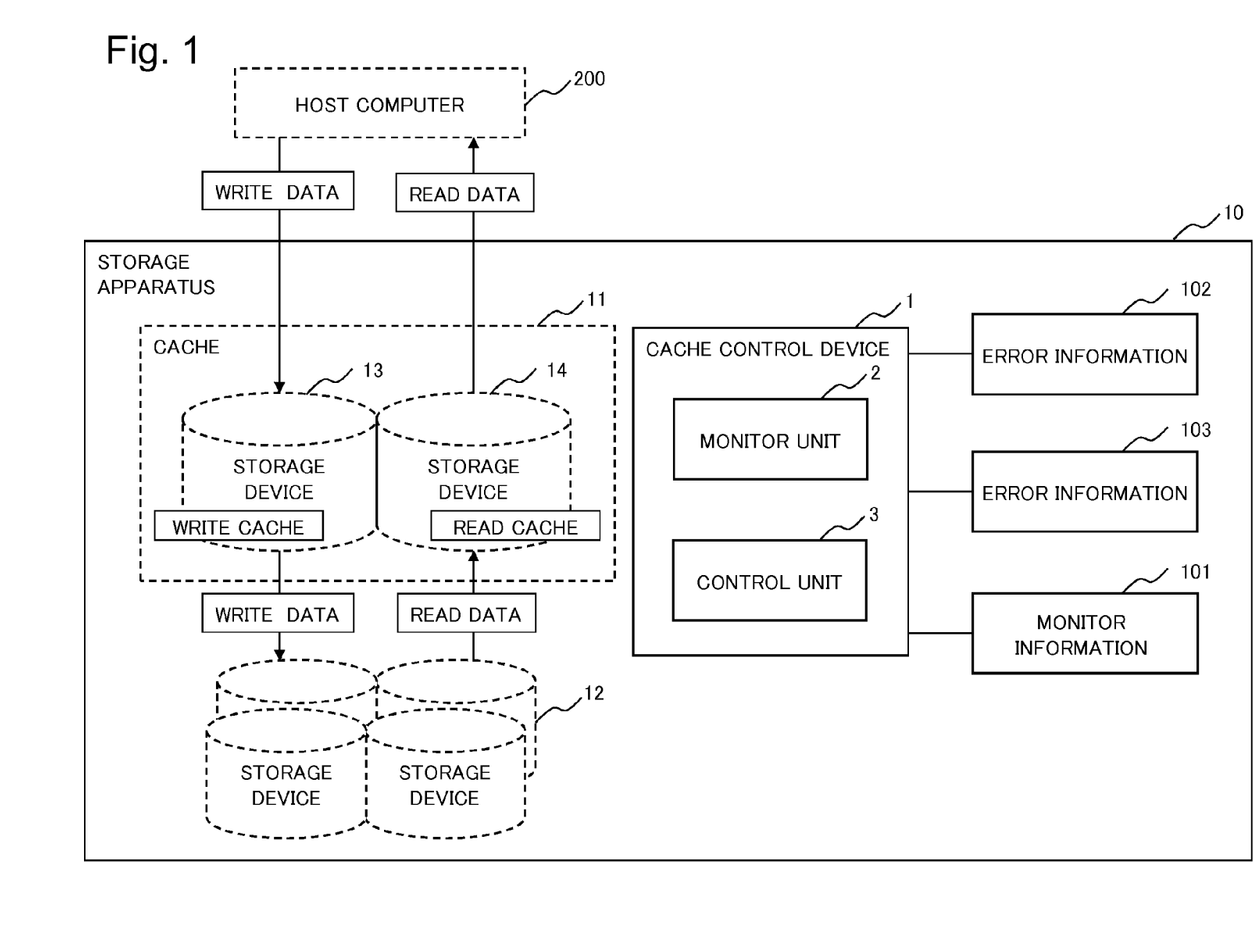
FIG. 1 is a block diagram illustrating a configuration of a storage apparatus including a cache control device in a first exemplary embodiment of the present invention.

FIG. 1 is a block diagram illustrating a configuration of a storage apparatus 10 including a cache control device 1 in a first exemplary embodiment of the present invention.

In FIG. 1, the storage apparatus 10 includes a cash 11, one or more storage devices 12, and the cache control device 1. The cache 11 includes a storage device 13 and a storage device 14.

In the following description, for the convenience of description, a first storage device will be referred to as "a storage device 13"; a second storage device will be referred to as "a storage device 14"; and a third storage device will be referred to as "a storage device 12".

Further, in the following description, for the convenience of description, as an example, it is assumed that the storage device 13 functions as a write cache and the storage device 14 functions as a read cache (this configuration is the same as that of each of exemplary embodiments described below).

More specifically, when performing a write processing, for example, the storage apparatus 10 performs process described below. That is, the storage apparatus 10 controls so as to cause the storage device 13 to cache a block of write information (also referred to as "a block of write data") having been transmitted from a host computer 200. The storage apparatus 10 controls so as to cause the storage device 12 to store therein the block of write information having been cached by the storage device 13.

When performing a read processing, for example, the storage apparatus 10 performs process described below. That is, the storage apparatus 10 controls so as to cause the storage device 14 to cache a block of read information (also referred to as "a block of read data") stored in the storage device 12. Further, the storage apparatus 10 controls so as to cause the storage device 14 to transmit the cached block of read information to the host computer 200.

Each of the storage devices (the storage device 12, the storage device 13, and the storage device 14) is, for example, a non-volatile storage device capable of reading and writing data by a computer. More specifically, for example, a non-volatile storage device, such as an HDD, an SSD, a semiconductor memory device, or a data storage medium similar to these, may be adopted as the storage device.

As shown in FIG. 1, the cache control device 1 includes a monitor unit 2 and a control unit 3.

The monitor unit 2 monitors an occurrence of a failure for each of the plurality of storage devices (the storage device 13 and the storage device 14) constituting the cache 11. That is, the monitor unit 2 monitors, for each of the plurality of storage devices, each storage device operating as a write cache or a read cache, a failure which occurs in the each storage device. When a failure has occurred in a specific storage device, the monitor unit 2 controls so as to cause a first error point to increment a value thereof.

Error information (error information 102 or error information 103) is information including the first error point and a second error point. The error information 102 is error information corresponding to the storage device 13. Further, the error information 103 is error information corresponding to the storage device 14. That is, the error information exists for each of the plurality of storage devices which constitute the cache 11.

More specifically, the monitor unit 2 monitors a failure which occurs in each of the storage device 13 and storage device 14.

When a failure has occurred in the storage device 13, the monitor unit 2 controls so as to cause the first error point included in the error information 102 to increment a value of the first error point.

When a failure has occurred in the storage device 14, the monitor unit 2 controls so as to cause the first error point included in the error information 103 to increment a value of the first error point. That is, the first error point included in each of the error information 102 and the error information 103 is a count-up counter which is caused to count up when a failure has occurred in a corresponding one of the storage devices.

Figure 2:
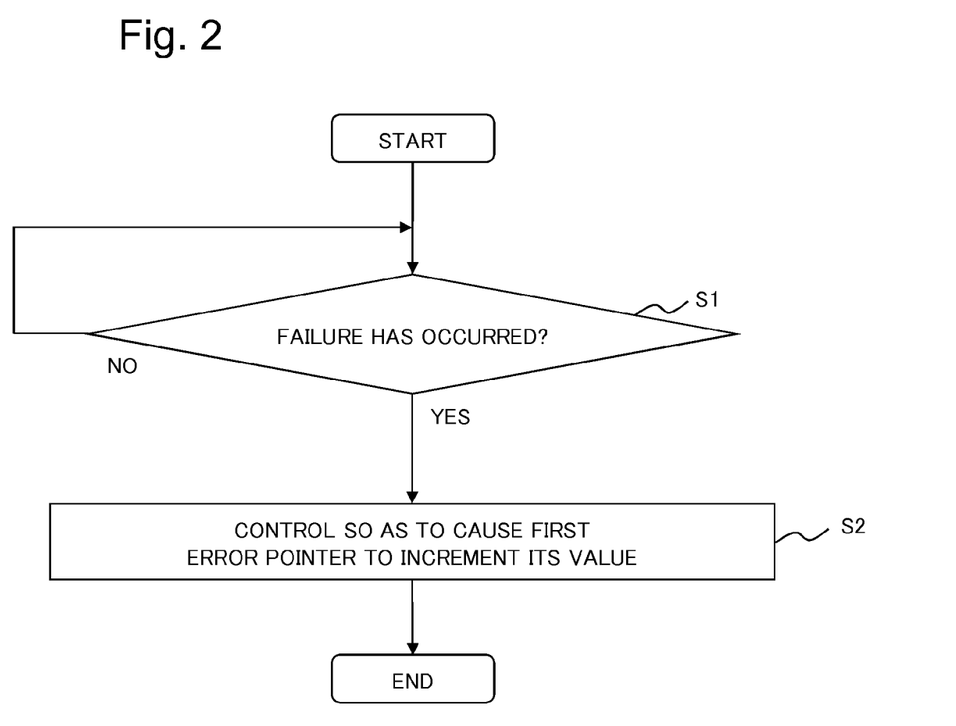
FIG. 2 is a flowchart illustrating operation performed by a monitor unit, in the first exemplary embodiment of the present invention.

Next, in the following description, operation of the monitor unit 2 in this exemplary embodiment will be described more specifically.

FIG. 2 is a flowchart illustrating operation performed by the monitor unit 2 in this first exemplary embodiment of the present invention. An operation procedure of the monitor unit 2 will be described along this flowchart.

Step S1:

The monitor unit 2 monitors each of the plurality of storage devices constituting the cache 11.

In this embodiment, the monitor unit 2 determines whether or not a failure has occurred in each of the storage device 13 and the storage device 14.

For example, the monitor unit 2 may be configured to determine whether or not a failure has occurred in each of the storage device 13 and the storage device 14 on the basis of a response class corresponding to a command having been issued to each of the storage device 13 and the storage device 14. The response class is, for example, information representing a class of a response to the command. That is, the response class is a normal response indicating a normal termination, an error response indicating that a failure has occurred, and no response indicating that any response has not been received. Further, as a cause of the error response, for example, a communication error due to a failure of communication with the host computer 200, a medium (memory) error, and a hardware error due to a malfunction of a hardware component can be conceived. In the case where the response class is other than the normal response, the monitor unit 2 can determine that a failure has occurred.

"YES" in step S1:

In the case where, as a result of determination for a storage device with respect to whether or not a failure has occurred, the monitor unit 2 has determined that a failure has occurred, the monitor unit 2 causes this process flow to proceed to step S2.

"NO" in Step S1:

In the case where, as a result of determination for a storage device with respect to whether or not a failure has occurred, the monitor unit 2 has determined that any failure has not occurred, the monitor unit 2 returns this process flow to step S1. That is, the monitor unit 2 continues to monitor each of the storage devices.

Step S2:

The monitor unit 2 controls so as to cause the first error point, which is included in the error information (i.e., the error information 102 or the error information 103), to increment a value thereof.

Hereinafter, for example, operation in the case where a failure has occurred in the storage device 13 will be described. The monitor unit 2 controls so as to cause the first error point included in the error information 102 to increment a value thereof.

The monitor unit 2 repeatedly monitors each of the plurality of storage devices constituting the cache 11 in this way.

Next, in the following description, operation of the control unit 3 will be described.

In the following description, for the convenience of description, for example, information related to a life-span will be referred to as merely "life-span information".

Further, in the following description, a difference value between a value of the first error point and a value of the second error point in the storage device 13 will be referred to as "a first point difference value". Similarly, in the following description, a difference value between a value of the first error point and a value of the second error point in the storage device 14 will be referred to as "a second point difference value". In the following description, a difference value between the first point difference value and the second point difference value will be referred to as "a third point difference value". Moreover, in the following description, a difference value between pieces of life-span information acquired by the control unit 3 will be referred to as "a life-span difference value" (this is the same as in the case of each of exemplary embodiments described below).

The control unit 3 performs processing described below at a monitoring time. The control unit 3 determines superiority or inferiority of the plurality of storage devices on the basis of the pieces of failure information (for example, the pieces of error information 102 and 103) which indicate the result of monitoring by the monitor unit 2, pieces of information each related to a life-span (i.e., pieces of life-span information), and pieces of determination information. Further, the control unit 3 changes a configuration of the cache 11 in accordance with the result of the determination on the superiority or inferiority (swap processing). That is, when having determined that, among the plurality of storage devices, a storage device operating as the write cache is inferior to another storage device, the control unit 3 assigns the another storage device as the write cache.

More specifically, the control unit 3 performs failure determination processing on the basis of, among the plurality of storage devices, the failure information related to the storage device operating as the write cache (i.e., a first storage device) and the failure information related to another storage device different from the relevant storage device. In the case where, as a result of the failure determination processing, the control unit 3 has determined that the storage device operating as the write cache is inferior to the another storage devices, the control unit 3 changes the configuration of the cache 11. In contrast, in the case where the control unit 3 has determined that the storage device operating as the write cache is not inferior to any one of the other storage devices, the control unit 3 performs life-time determination processing on the basis of the life-span information related to the storage device operating as the write cache and the life-span information related to the another storage device. In the case where, as a result of the failure determination processing, the control unit 3 has determined that the storage device operating as the write cache is inferior to the another storage device, the control unit 3 changes the configuration of the cache 11. In addition, the failure determination processing and the life-time determination processing will be described below in this exemplary embodiment.

In the following description, the life-span information and monitor information 101 will be described.

The life-span information is, for example, information related to a life-span of a storage device managed by each of the storage device 13 and the storage device 14. For example, for each of the storage device 13 and the storage device 14, the life-span information is made equal to "100" in the state in which the relevant storage device is unused. For example, for each of the storage device 13 and the storage device 14, the life-span information is made equal to "0" in the state in which the relevant storage device has reached its life-span. That is, the life-span information is a count-down counter. More specifically, for example, in the case where an SSD is adopted as a storage device, the life-span information includes information indicating the number of operations of writing into the SSD. In this regard, however, the present invention which is described by exemplifying this exemplary embodiment is not limited to the configuration described above (this is the same as in the case of each of exemplary embodiments described below).

Further, the monitor information 101 includes information indicated below. That is, the monitor information 101 includes:

"A monitoring time" indicating a time at which the control unit 3 starts processing;

"Interval information" indicating a predetermined period of time from the monitoring time; and Determination information used for determination in the swap processing.

Hereinafter, the determination information includes "a point difference threshold value (a first threshold value)", "a life-span threshold value (a second threshold value)", and "a life-span difference threshold value (a third threshold value)".

For example, a configuration may be made such that the monitor information 101 and the error information 102 and 103 are stored in a storage area (not illustrated) included in the storage apparatus 10. In this regard, however, the present invention which is described by exemplifying this exemplary embodiment is not limited to the configuration described above (hereinafter, this is the same as in the case of each of exemplary embodiments described below).

Figure 3A:
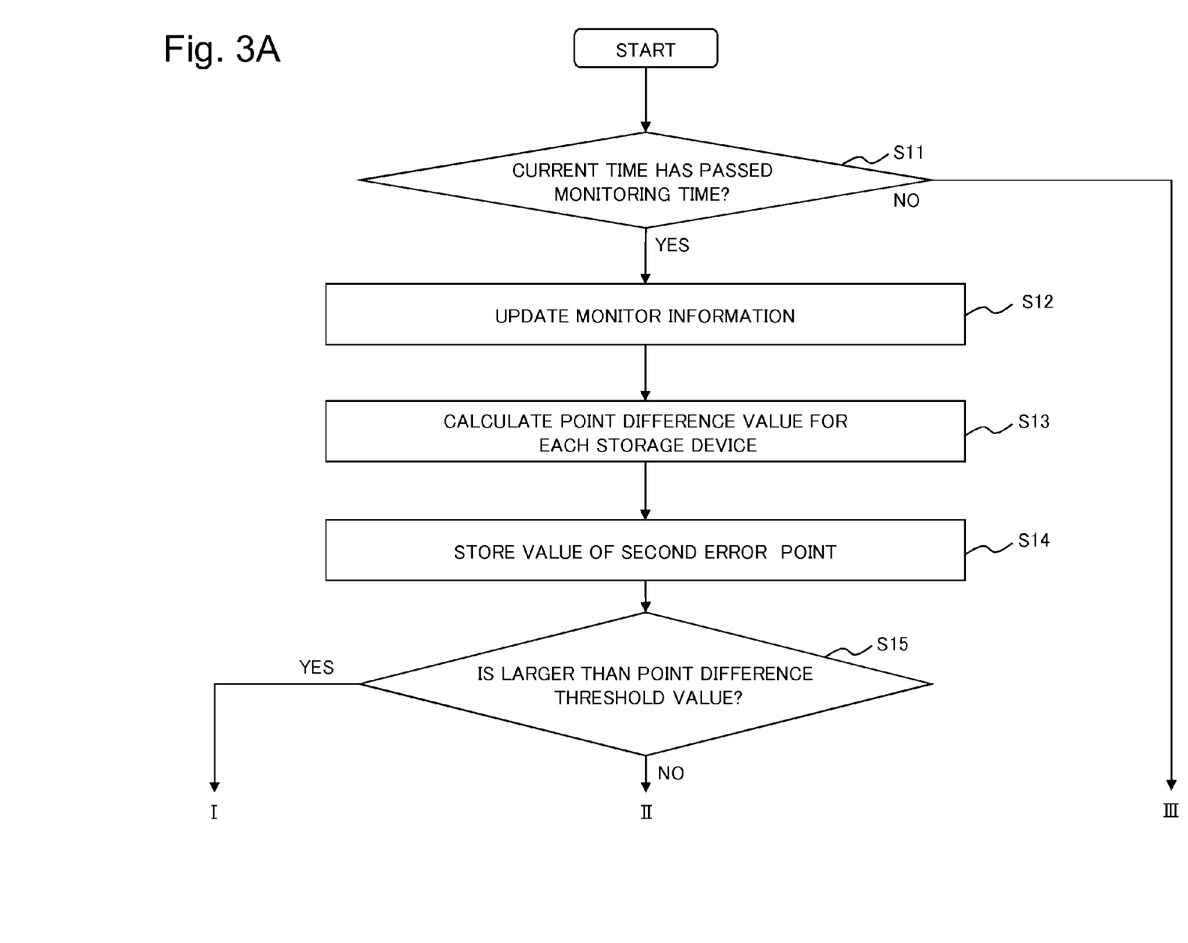
FIG. 3A is a flowchart illustrating operation performed by a control unit, in the first exemplary embodiment of the present invention.
Figure 3B:
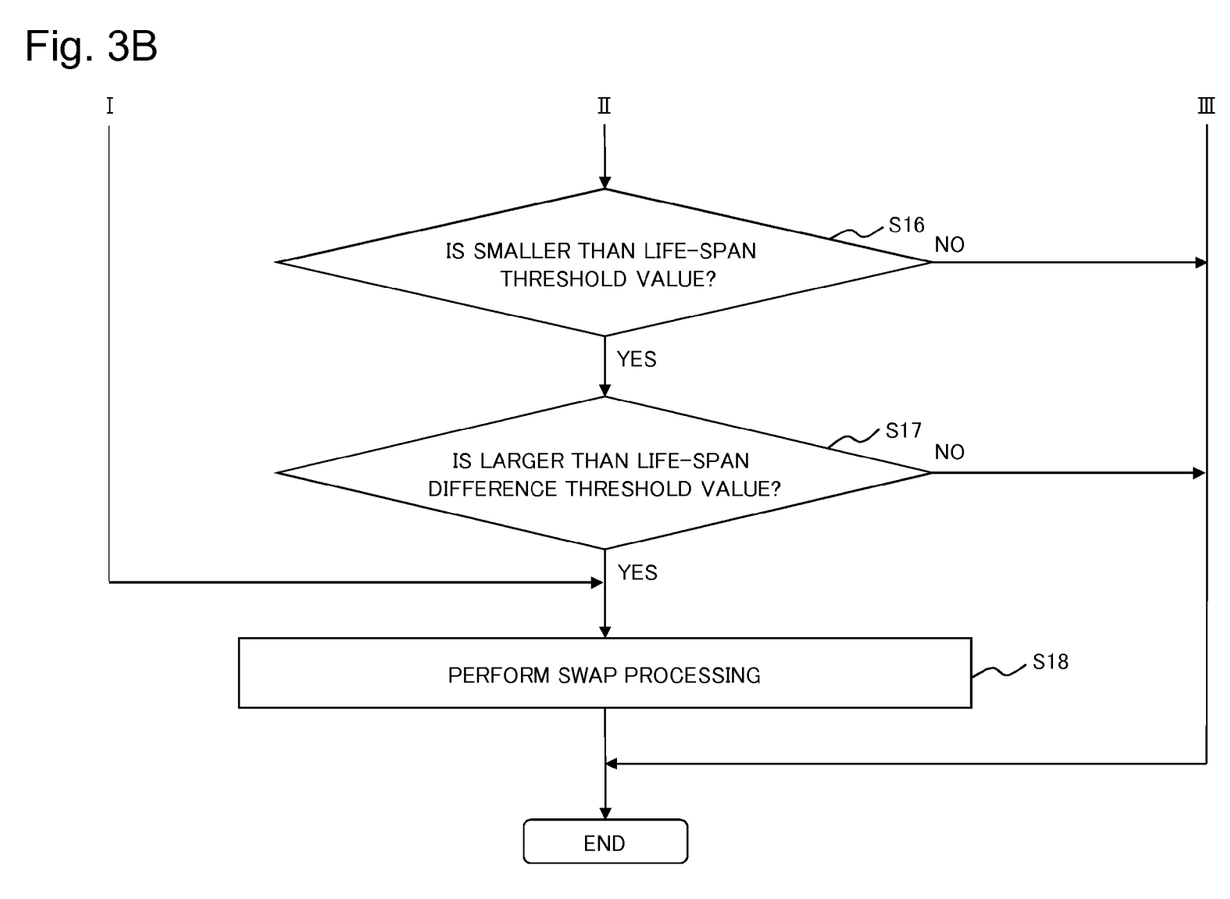
FIG. 3B is a flowchart illustrating operation performed by the control unit, in the first exemplary embodiment of the present invention.

In the following description, the operation of the control unit 3 in this exemplary embodiment will be described more specifically.

FIG. 3A and FIG. 3B illustrate a flowchart indicating operation performed by the control unit 3 in this first exemplary embodiment of the present invention. An operation procedure of the control unit 3 will be described along the flowchart.

Step S11:

The control unit 3 compares the monitoring time, which is included in the monitor information 101, with current time.

"YES" in step S11:

In the case where, as a result of the comparison between the monitoring time and the current time, the control unit 3 has determined that the current time has passed the monitoring time, the control unit 3 causes this process flow to proceed to step S12.

"NO" in step S11:

In the case where, as a result of the comparison between the monitoring time and the current time, the control unit 3 has determined that the current time does not yet pass the monitoring time, the control unit 3 terminates this process flow.

Step S12:

The control unit 3 performs update processing on the monitor information 101.

More specifically, the control unit 3 calculates a next monitoring time on the basis of the monitoring time and the interval information which are included in the monitor information 101. That is, the control unit 3 calculates a next time (a monitoring time) at which processing is to be performed in the device itself.

The control unit 3 stores the calculated next monitoring time into the monitor information 101. That is, the control unit 3 updates the monitoring time included in the monitor information 101 to the calculated monitoring time.

The control unit 3 can calculate the next monitoring time by adding the interval information to the monitoring time.

Step S13:

The control unit 3 calculates, for each storage device, a difference value on the basis of the first error point and the second error point which are stored in the error information (the error information 102 or the error information 103). That is, for example, the control unit 3 subtracts, for each storage device, the second error point from the first error point, these error points being stored in the set of error information. In this way, the control unit 3 calculates the difference value. In this regard, however, the present invention which is described by exemplifying this exemplary embodiment is not limited to the configuration described above (this is the same as in the case of each of exemplary embodiments described below).

More specifically, the control unit 3 calculates the difference value (the first point difference value) on the basis of the first error point and the second error point, which are stored in the error information 102. Similarly, the control unit 3 calculates the difference value (the second point difference value) on the basis of the first error point and the second error point, which are stored in the error information 103.

Step S14:

The control unit 3 stores, for each storage device, the value of the first error point stored in the error information into the error information as the value of the second error point.

More specifically, the control unit 3 stores the value of the first error point stored in the error information 102 into the error information 102 as the value of the second error point. Further, the control unit 3 stores the value of the first error point stored in the error information 103 into the error information 103 as the value of the second error point.

Step S15:

The control unit 3 performs error determination processing (failure determination processing).

The control unit 3 performs error determination processing on the basis of the calculated first point difference value and second point difference value, as well as the point difference threshold value.

More specifically, for example, the control unit 3 subtracts, for a storage device operating as the write cache, the point difference value of another storage device different from the storage device from the point difference value of the storage device. In this way, the control unit 3 calculates the difference value between those point difference values (i.e., the third point difference value). Next, the control unit 3 compares the calculated third point difference value with the point difference threshold value included in the monitor information 101. In this regard, however, the present invention which is described by exemplifying this exemplary embodiment is not limited to the configuration described below (this is the same as in the case of each of exemplary embodiments described below).

In the following description, it is assumed that the storage device operating as the write cache is the storage device 13. Further, in the following description, it is assumed that the another device different from the storage device 13 is the storage device 14.

Hereinafter, the control unit 3 subtracts the second point difference value of the storage device 14 from the first point difference value of the storage device 13. In this way, it is assumed that the control unit 3 calculates the third point difference value.

"YES" in step S15:

In the case where, as a result of the comparison, the control unit 3 has determined that the third point difference value is larger than the point difference threshold value, the control unit 3 causes this process flow to proceed to step S18.

"NO" in step S15:

In the case where, as a result of the comparison, the control unit 3 has determined that the third point difference value is not larger than the point difference threshold value, the control unit 3 causes this process flow to proceed to step S16.

Step S16:

The control unit 3 performs first life-time determination processing. That is, the control unit 3 acquires a information related to a life-span (i.e., the life-span information) from each of all the storage devices constituting the cache 11. The control unit 3 compares the life-span information related to the storage device operating as the write cache with the life-span threshold value included in the monitor information 101. Specifically, the control unit 3 acquires the life-span information related to each of the storage device 13 and the storage device 14 from the storage device 13 and the storage device 14.

The control unit 3 compares the value of life-span information related to the storage device 13 operating as the write cache with the life-span threshold value included in the monitor information 101.

"YES" in step S16:

In the case where, as a result of the comparison, the control unit 3 has determined that the value of the life-span information related to the storage device operating as the write cache is smaller than the life-span threshold value, the control unit 3 causes this process flow to proceed to step S17.

Here, in the case where, as a result of the comparison, the control unit 3 has determined that the value of the life-span information related to the storage device 13 is smaller than the life-span threshold value, the control unit 3 causes this process flow to proceed to step S17.

"NO" in step S16:

In the case where, as a result of the comparison, the control unit 3 has determined that the value of the life-span information related to the storage device operating as the write cache is not smaller than the life-span threshold value, the control unit 3 terminates this process flow.

Here, in the case where, as a result of the comparison, the control unit 3 has determined that the value of the life-span information related to the storage device 13 is not smaller than the life-span threshold value, the control unit 3 terminates this process flow.

Step S17:

The control unit 3 performs second life-time determination processing on the basis of the life-span information related to the storage device operating as the write cache, the life-span information related to the another storage device different from the storage device, and the life-span difference threshold value.

More specifically, for example, the control unit 3 subtracts the life-span information related to the storage device operating as the write cache from the life-span information related to the another storage device different from the storage device. In this way, the control unit 3 calculates a difference value (the life-span difference value). Next, the control unit 3 compares the calculated life-span difference value with the life-span difference threshold value included in the monitor information 101. In this regard, however, the present invention described by exemplifying this exemplary embodiment is not limited to the configuration described below (this is the same as in the case of each of exemplary embodiments described below).

Hereinafter, the control unit 3 subtracts the life-span information related to the storage device 13 from the life-span information related to the storage device 14. In this way, the control unit 3 calculates the life-span difference value. The control unit 3 compares the calculated life-span difference value with the life-span difference threshold value included in the monitor information 101.

"YES" in Step S17:

In the case where, as a result of the comparison, the control unit 3 has determined that the calculated life-span difference value is larger than the life-span difference threshold value, the control unit 3 causes this process flow to proceed to step S18.

"NO" in Step S17:

In the case where, as a result of the comparison, the control unit 3 has determined that the calculated life-span difference value is not larger than the life-span difference threshold value, the control unit 3 terminates this process flow.

Step S18:

The control unit 3 performs swap processing. That is, the control unit 3 changes the configuration of the cache 11.

More specifically, the control unit 3 allocates the storage device operating as the write cache to a read cache. In contrast, the control unit 3 allocates another storage device operating as the read cache to the write cache.

For example, this description will be made assuming that the storage device 14 is a storage device for which a failure is more unlikely to occur than any other storage device and which has a longer life-span than any other storage device. The control unit 3 allocates the storage device 14, for which a failure is more unlikely to occur than any other storage device and which has a longer life-span than any other storage device, to the write cache. Further, the control unit 3 allocates the other storage device, that is, the storage device 13, to the read cache.

In this way, the control unit 3 can allocate, among one or more storage devices, a storage device for which a failure is more unlikely to occur than any other storage device and which has a longer life-span than any other storage device, to the write cache. That is, the storage apparatus 10 can cause a high-safety write cache to cache blocks of data. Thus, the storage apparatus 10 makes it possible to reduce a risk that the blocks of data are lost.

In the aforementioned exemplary embodiment, for the convenience of description, the description has been made by way of an example in which a configuration is made such that the first and second error points are stored in the error information provided for each of the storage devices. Nevertheless, any exemplary embodiment according to the present invention is not limited to this configuration. The configuration may be made such that the first and second error points are stored in one error information common to the storage devices. In this case, the configuration may be also made such that a storage device corresponding to each pair of the first and second error points can be identified.

The cache control device 1 is also applicable to, for example, caches constituting a group of RAID.

In such a way as described above, the cache control device 1 according to this exemplary embodiment makes it possible to, even when a failure is occurred in a cache, reduce a risk that information is lost due to the failure. Reasons for this are as described below.

That is, a reason is that the cache control device 1 includes the monitor unit 2 and control unit 3. The monitor unit 2 monitors an occurrence of a failure for each of the plurality of storage devices constituting the cache 11. Another reason is that the control unit 3 can determine superiority or inferiority between any two of the storage devices on the basis of the pieces of error information and the pieces of life-span information with respect to the storage devices, as well as the pieces of determination information. A further reason is that the control unit 3 can change the configuration of the cache 11 in accordance with a result of the determination.

Through this configuration, when having determined that a failure is highly likely to occur in a storage device currently operating as the write cache, the cache control device 1 can specify a storage device for which a failure is unlikely to occur. Further, the cache control device 1 can perform switching such that a storage device operating as the write cache is switched from the storage device currently operating as the write cache to the specified storage device. That is, the cache control device 1 makes it possible to prevent the occurrence of a failure in the write cache. Further, the cache control device 1 makes it possible to reduce a risk that data is lost.

<Second Exemplary Embodiment>

Next, a second exemplary embodiment based on the aforementioned cache control device 1 according to the first exemplary embodiment of the present invention will be described. In the following description, description will be made focusing attention on characteristic portions according to this embodiment. In this case, components similar to the components of the aforementioned exemplary embodiment are denoted by reference numbers identical to those of the components of the aforementioned exemplary embodiment, and thereby, duplicated description is omitted.

A cache control device 1 in this second exemplary embodiment of the present invention will be described with reference to FIGS. 2 to 5.

Figure 4:
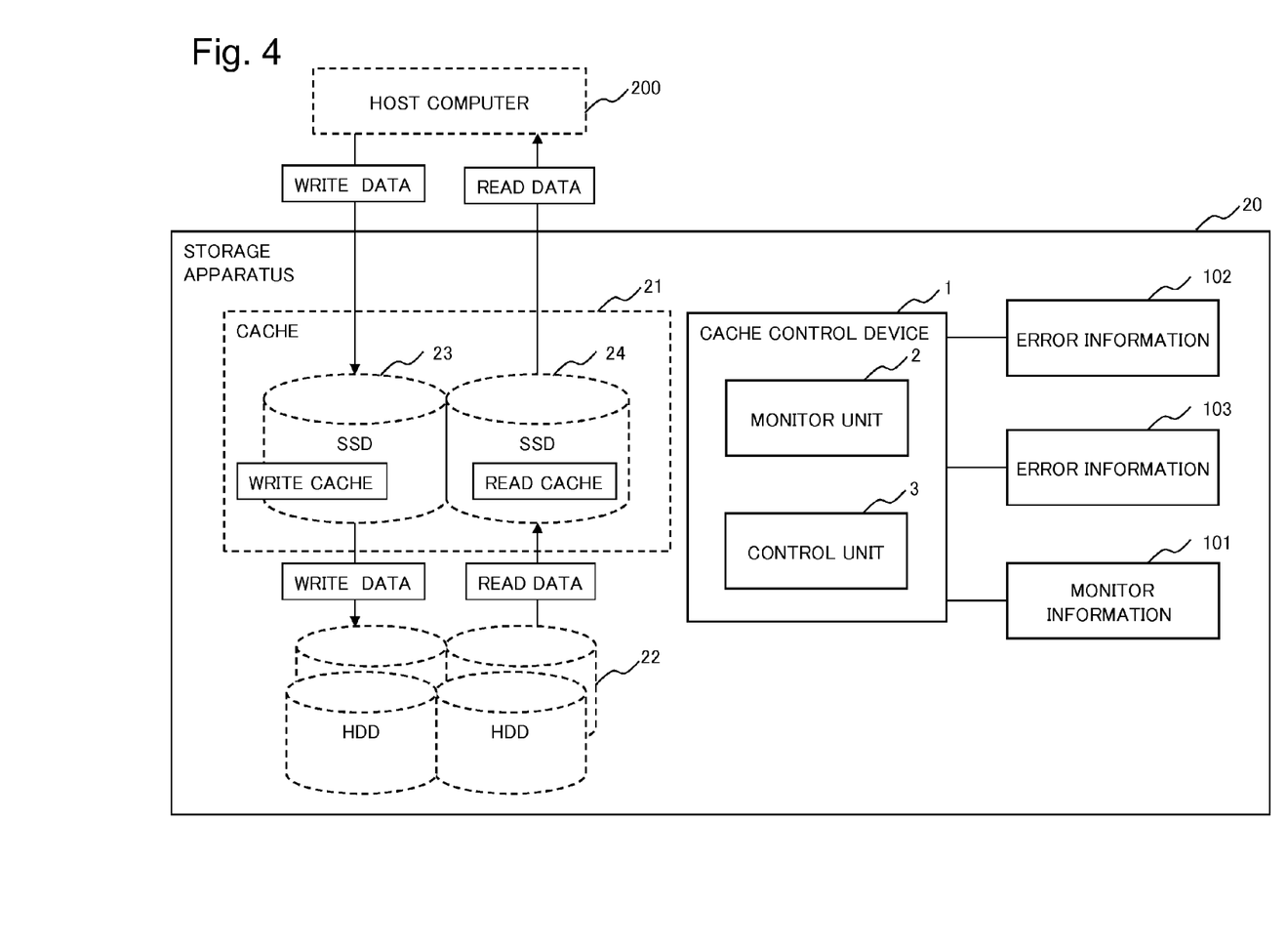
FIG. 4 is a block diagram illustrating a configuration of the storage apparatus including the cache control device, in a second exemplary embodiment of the present invention.

FIG. 4 is a block diagram illustrating a configuration of a storage apparatus 20 including the cache control device 1, in this second exemplary embodiment of the present invention.

In FIG. 4, the storage apparatus 20 includes an SSD cash 21, one or more HDDs 22, and the cache control device 1. The SSD cache 21 includes an SSD 23 and an SSD 24. The cache control device 1 includes the monitor unit 2 and the control unit 3.

The HDD 22 corresponds to the storage device 12 having been described in the first exemplary embodiment. The SSD 23 corresponds to the storage device 13 having been described in the first exemplary embodiment. The SSD 24 corresponds to the storage device 14 having been described in the first exemplary embodiment.

Next, in following description, more specifically, operation performed by the cache control device 1 in this exemplary embodiment will be described with reference to FIGS.

2 to 5. In the following description, it is assumed that a failure which allows continued processing has occurred in the SSD 23.

Figure 5:
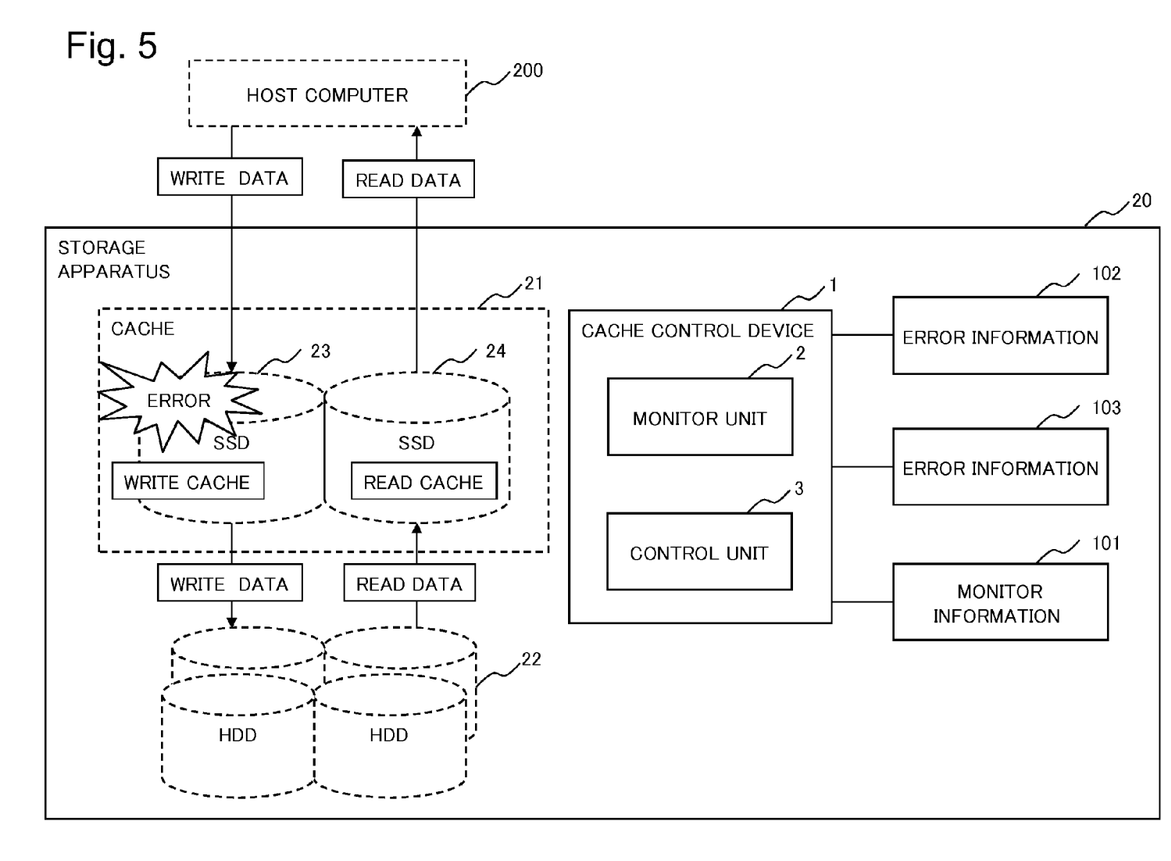
FIG. 5 is a diagram conceptually illustrating a state in which a failure has occurred in one of SSDs in the storage apparatus including the cache control device, in the second exemplary embodiment of the present invention.

FIG. 5 is a diagram conceptually illustrating a state in which a failure has occurred in the SSD 23 in the storage apparatus 20 including the cache control device 1, in this second exemplary embodiment of the present invention.

The configuration of the storage apparatus 20, shown in FIG. 5, is the same as that of the storage apparatus 20 shown in FIG. 4. Thus, detailed description of the configuration of the storage device 20, shown in FIG. 5, is omitted here.

In the following description, for the convenience of description, as an example, it is assumed that the SSD 23 functions as the write cache. Further, it is assumed that the SSD 24 functions as the read cache.

In addition, hereinafter, for the convenience of description, description will be made by exemplifying the configuration described above. The present invention described by exemplifying this exemplary embodiment is, however, not limited to the configuration described above (this is the same as in the case of an exemplary embodiment described below).

First, in the following description, monitoring processing by the monitor unit 2 will be described with reference to FIG. 2.

The monitor unit 2 determines that a failure has occurred in the SSD 23 ("YES" in step S1). The monitor unit 2 controls so as to cause the first error point included in the error information 2 to increment a value of the first error point itself (step S2).

Next, in the following description, a series of processes performed by the control unit 3 will be described with reference to FIGS. 3A and 3B.

The control unit 3 determines that current time has passed the monitoring time ("YES" in step S11). The control unit 3 calculates the next monitoring time on the basis of the monitoring time and the interval information, which are included in the monitor information 101. The control unit 3 updates the monitoring time included in the monitor information 101 into the calculated monitoring time (step S12). The control unit 3 calculates the first point difference value on the basis of the first error point and the second error point which are stored in the error information 102. Further, the control unit 3 calculates the second point difference value on the basis of the first error point and the second error point which are stored in the error information 103 (step S13). The control unit 3 stores the value of the first error point stored in the error information 102 into the error information 102 as the value of the second error point. The control unit 3 stores a value of the first error point stored in the error information 103 into the error information 103 as the value of the second error point (step S14).

The control unit 3 subtracts the second point difference value of the SSD 24, which is another SSD different from the SSD 23, from the first point difference value of the SSD 23 operating as the write cache. In this way, the control unit 3 calculates the third point difference value (step S15).

Next, the control unit 3 compares the calculated third point difference value with the point difference threshold value included in the monitor information 101. As a result of the comparison, the control unit 3 determines that the third point difference value is not larger than the point difference threshold value ("NO" in Step S15).

The control unit 3 acquires the life-span information from each of the SSD 23 and the SSD 24. Further, the control unit 3 compares the value of the life-span information related to the SSD 23 operating as the write cache with the life-span threshold value included in the monitor information 101. As a result of the comparison, the control unit 3 determines that the value of the life-span information related to the SSD 23 operating as the write cache is smaller than the life-span threshold value ("YES" in step S16).

The control unit 3 subtracts the life-span information related to the SSD 23 operating as the write cache from the life-span information related to the SSD 24. In this way, the control unit 3 calculates the life-span difference value. Next, the control unit 3 compares the calculated life-span difference value with the life-span difference threshold value included in the monitor information 101. As a result of the comparison, the control unit 3 determines that the calculated life-span difference value is larger than the life-span difference threshold value ("YES" in step S17).

The control unit 3 allocates the SSD 23 operating as the write cache to the read cache. In contrast, the control unit 3 allocates the SSD 24 operating as the read cache to the write cache (step S18).

In the aforementioned exemplary embodiment, for the convenience of description, the description has been made by way of an example in which a configuration is made such that the cache control device 1 performs swap processing in accordance with a result of determination on superiority or inferiority between two storage devices (the SSD 23 and the SSD 24). Nevertheless, any exemplary embodiment according to the present invention is not limited to this configuration. The cache control device 1 may be configured to, in accordance with a result of determination on the superiority or inferiority between the two storage devices, allocate a spare storage device different from the two storage devices to the write cache. Alternatively, the cache control device 1 may be configured to, in accordance with a result of determination on superiority or inferiority between each pair of storage devices, which is associated with a corresponding one of a plurality of selected pairs of storage devices, perform swap processing.

In this case, the control unit 3 may realize the configuration by allocating a storage device, for which a failure is more unlikely to occur than any other one of the plurality of storage devices and which has a longer life-span than any other one of the plurality of storage devices, to the write cache.

As described above, the cache control device 1 according to this exemplary embodiment brings about the advantageous effects having been described in the first exemplary embodiment. That is, according to this exemplary embodiment, even when a failure is occurred in a cache, it is possible to reduce a risk that information is lost due to the failure. Moreover, the cache control device 1 is preferable of being applied to a storage apparatus provided with a group of SSD caches. Further, the cache control device 1 makes it possible to reduce a risk that data is lost. Reasons for this are as described below.

That is, the cache control device 1 can control an SSD which is superior to a HDD in I/O performance. Further, even for the SSD cache 21 which includes a plurality of storage devices, the cache control device 1 can determine superiority or inferiority of the plurality of storage devices. The cache control device 1 can allocate a storage device, for which a failure is more unlikely to occur than any other one of the plurality of storage devices and which has a longer life-span than any other one of the plurality of storage devices, to the write cache in accordance with a result of the determination on the superiority or inferiority.

(Example of Hardware Structure)

Each portion illustrated in the drawings of the aforementioned embodiments can be regarded as a function unit (a processing unit or a software module) of a software program. Each of these software modules may be realized by a dedicated hardware component. In this regard, the configuration resulting from partitioning of these portions illustrated in the drawings is a configuration for the convenience of description, and when implementing this configuration, various implementation methods will be conceived. An example of a hardware environment in such a case will be described with reference to FIG. 6.

Figure 6:
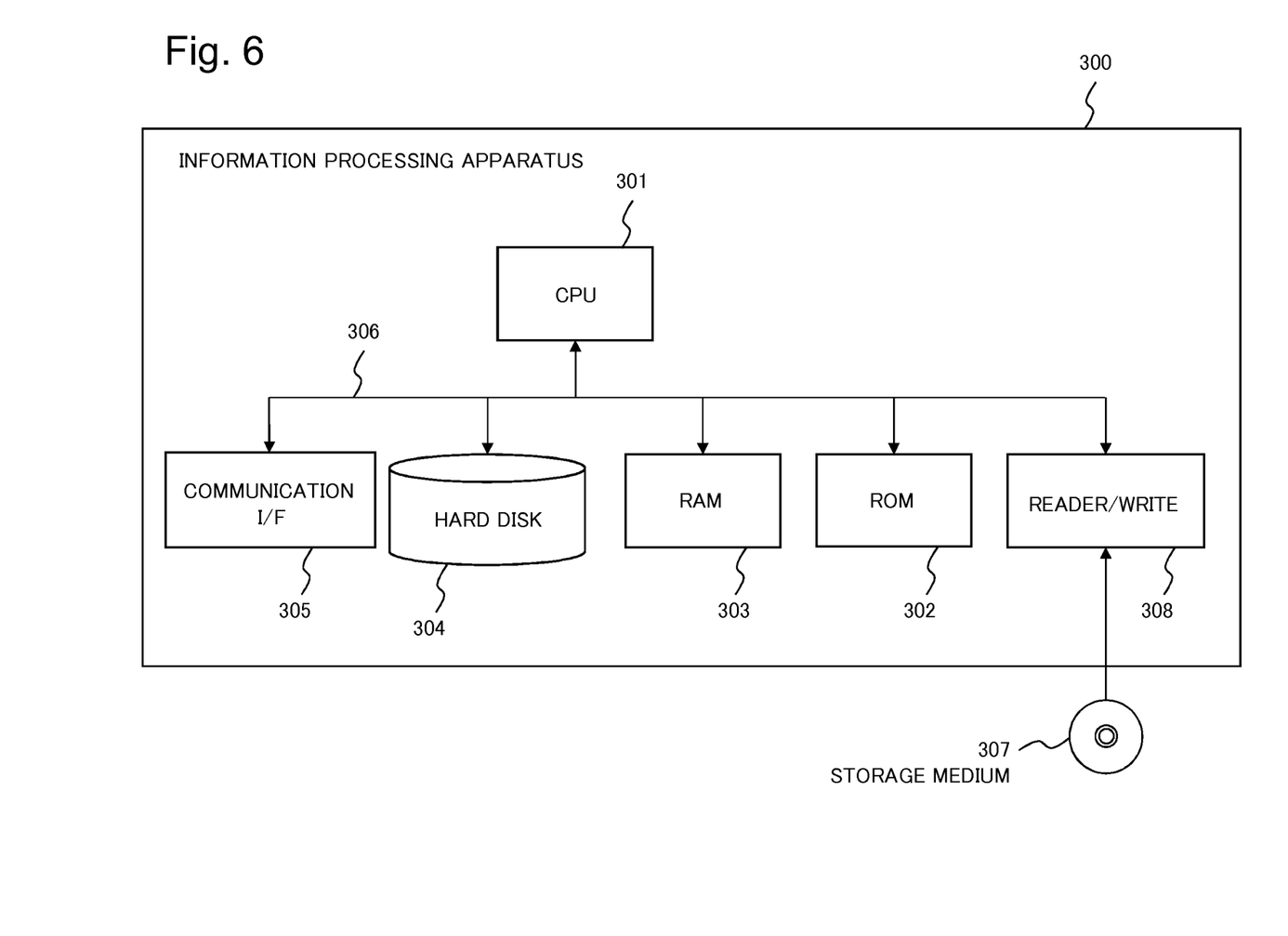
FIG. 6 is a block diagram that describes an example of a hardware configuration of an information processing device which can realize each of the exemplary embodiments according to the present invention.

FIG. 6 is a diagram that describes an example of a configuration of an information processing apparatus 300 (computer) which enables a cache control device according to each of the exemplary embodiments of the present invention to run thereon. That is, FIG. 6 represents a hardware environment which has a configuration of a computer (information processing apparatus), such as a server, and which can realize the individual functions of the aforementioned exemplary embodiments. This computer can realize a cache control device which is the whole or part of the cache control device 1 (FIG. 1) or the cache control device 1 (FIG. 4).

The information processing apparatus 300 shown in FIG. 6 is a general computer in which the following components are electrically connected to each another via a bus 306 (a communication line).

a central processing unit (CPU) 301,
a read only memory (ROM) 302,
a random access memory (RAM) 303,
a hard disk 304 (storage apparatus),
a communication interface (hereinafter, referred to as "I/F") 305 with external devices, and
a reader/writer 308 which can reading and writing data stored in a storage medium 307, such as a compact disc read only memory (CD-ROM).

Further, the present invention which has been described by exemplifying the aforementioned exemplary embodiments can be achieved by the following procedure. That is, the information processing apparatus 300 shown in FIG. 6 is supplied with a computer program which can realize the functions having been described referring to the block diagrams (FIG. 1 and FIG. 4) and the flowcharts (FIG. 2, FIG. 3A, and FIG. 3B). Thereafter, the CPU 301 of the hardware components reads out and executes the computer program, and thereby the functions are realized. Further, the computer program having been supplied inside the apparatus should be stored in a readable/writable temporary memory (RAM 303) or a non-volatile storage device, such as the hard disk 304.

Further, in the above case, currently, a method of supplying the computer program to the inside of the hardware can be realized by employing a general procedure. As the method of supplying the computer program to the inside of the hardware, for example, there is a method of installing it inside the apparatus via the storage medium 307, which is one of various types of storage media, such as a CD-ROM, or a method of downloading it from the outside via a communication line, such as the Internet. Further, in such a case, it can be understood that the present invention is realized by codes composing the computer program or a storage medium in which the codes are stored.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

DESCRIPTION OF REFERENCE NUMERALS

1: cache control device
2: monitor unit
3: control unit
10, 20, and 210: storage apparatus
11: cache
12, 13, and 14: storage device
21: SSD cache
22 and 230: HDD
23, 24, 221, and 222: SSD
101: monitor information
102 and 103: error information
200: host computer
220: SSD cache
300: Information processing apparatus
301: CPU
302: ROM
303: RAM
304: hard disk
305: communication interface
306: bus
307: storage medium
308: reader/writer

The invention claimed is:

1. A cache control device comprising:
a monitor unit configured to monitor an occurrence of a failure of a plurality of storage devices which operate as a write cache or a read cache constituting a cache; and
a control unit configured to determine superiority or inferiority of the plurality of storage devices on the basis of life-span information related to a life-span of the plurality of storage devices and failure information which indicates a result of the monitoring by the monitor unit of the plurality of storage devices, and to change a configuration of the cache by allocating, when determining that, among the plurality of storage devices, a first storage device operating as the write cache is inferior to another storage device different from the first storage device, the another storage device to the write cache.

2. The cache control device according to claim 1, wherein the control unit is configured to perform a failure determination processing on the basis of the failure information related to the first storage device and the failure information related to the another storage device, and when determining that the first storage device is inferior to the another storage device as one of results of the failure determination processing, perform a change processing of the configuration of the cache, and
the control unit is configured to, when determining that the first storage device is not inferior to the another storage device as the other one of the results of the failure determination processing, perform a life-span determination processing on the basis of the life-span information related to the first storage device and the life-span information related to the another storage device, and when determining that the first storage device is inferior to the another storage device as a result of the life-span determination processing, perform the change processing of the configuration of the cache.

3. The cache control device according to claim 2, wherein in the failure determination processing, the control unit acquires a difference between a first error point and a second error point stored in the failure information, and stores a value of the first error point into the failure information as a value of the second error point, and the control unit acquires a difference value between a value indicating a first difference, which is acquired on the basis of the failure information for the first storage device, and a value indicating a second difference, which is the difference acquired on the basis of the failure information for the another storage device, and the control unit compares the difference value and a first threshold value, as one of results of the comparison with the first threshold value, determines that the first storage device is inferior to the another storage device, and, as the other one of the results of the comparison with the first threshold value, and determines that the first storage device is not inferior to the another storage device.

4. The cache control device according to claim 2, wherein in the life-span determination processing, the control unit acquires the life-span information from the plurality of storage devices, and the control unit compares the acquired life-span information related to the first storage device and a second threshold value, as one of results of the comparison with the second threshold value, acquires a difference value between the acquired life-span information related to the another storage device and the life-span information related to the first storage device, compares the acquired difference value and a third threshold value, and, as one of results of the comparison with the third threshold value, and determines that the first storage device is inferior to the another storage device.

5. The cache control device according to claim 1, wherein the monitor unit is configured to, when a failure has occurred in one of the plurality of storage devices, control so as to cause the first error point to increment a value of the first error point itself.

6. The cache control device according to claim 1, the plurality of storage devices is an SSD.

7. A storage apparatus comprising the cache control device according to claim 1.

8. A cache control method comprising:

monitoring, by an information processing apparatus, an occurrence of a failure a plurality of storage devices which operate as a write cache or a read cache constituting a cache; and determining, by the information processing apparatus, superiority or inferiority of the plurality of storage devices on the basis of life-span information related to a life-span of the plurality of storage devices and failure information which indicates a result of the monitoring of the plurality of storage devices, and changing, by the information processing apparatus, a configuration of the cache by allocating, when determining that, among the plurality of storage devices, a first storage device operating as the write cache is inferior to another storage device different from the first storage device, the another storage device to the write cache.

9. A non-transitory computer readable storage medium storing a computer program which causes a computer to realize:

a function that monitors an occurrence of a failure a plurality of storage devices which operate as a write cache or a read cache constituting a cache; and a function that determines superiority or inferiority of the plurality of storage devices on the basis of life-span information related to a life-span of the plurality of storage devices and failure information which indicates a result of the monitoring of the plurality of storage devices, and changing a configuration of the cache by allocating, when determining that, among the plurality of storage devices, a first storage device operating as the write cache is inferior to another storage device different from the first storage device, the another storage device to the write cache.

* * * * *